United States Patent [19]

O'Brien

[11] Patent Number: 5,358,991

[45] Date of Patent: Oct. 25, 1994

[54] FLAME RETARDED POLYETHYLENE WIRE INSULATIONS

[75] Inventor: Douglas D. O'Brien, Richmond, Ind.

[73] Assignee: Belden Wire & Cable Company, Richmond, Ind.

[21] Appl. No.: 91,977

[22] Filed: Jul. 15, 1993

[51] Int. Cl.$^5$ .............. C08K 3/10; C08K 5/02; C08K 3/38; C08L 23/04

[52] U.S. Cl. .................. 524/399; 524/405; 524/406; 524/411; 524/412; 524/469; 524/528; 525/240

[58] Field of Search ............ 525/240; 524/528, 405, 524/411, 412, 469, 399, 406

[56] References Cited

U.S. PATENT DOCUMENTS

| | | | |
|---|---|---|---|
| 3,231,636 | 1/1966 | Snyder et al. | 525/240 |
| 3,243,395 | 3/1966 | Guillet et al. | 525/240 |
| 3,331,797 | 7/1967 | Kopetz et al. | 524/469 |
| 3,355,520 | 11/1967 | Maloney et al. | 525/240 |
| 3,900,533 | 8/1975 | Krackeler et al. | 524/528 |
| 4,089,912 | 5/1978 | Levek et al. | 524/412 |
| 4,373,048 | 2/1983 | Schubert et al. | 524/405 |
| 4,857,673 | 8/1989 | Wilkus et al. | 524/412 |

FOREIGN PATENT DOCUMENTS 4-296342  10/1992  Japan ............ 524/528

OTHER PUBLICATIONS

Great Lakes Chemical Corporation, "Great Lakes is Basic in Bromine". 3 pp.
Occidental Chemical Corporation, "Dechlorane Plus", Data Sheet 0052 489 4 sheets.
ASTM D1248–1 sheet.
Modern Plastics, "Raw Materials" Mid–Nov. 1993.
Exxon Chemical, Exact Polymers for Wire and Cable Applications, 1 sheet.

*Primary Examiner*—Carman J. Seccuro, Jr.
*Attorney, Agent, or Firm*—Laff, Whitesel, Conte & Saret, Ltd.

[57] ABSTRACT

A flame retarded composition for wire insulations that includes a polyethylene blend having a high density polyethylene, in an amount from about 50 to about 95 parts per hundred, and a very low density polyethylene, in an amount from about 5 to about 50 parts per hundred, a primary brominated flame retardant, in an amount from about 30 to about 40 parts per hundred, a secondary chlorinated flame retardant, in an amount from about 5 to about 15 parts per hundred, a first flame retarding synergist, in an amount from about 12 to 20 parts per hundred, a second flame retarding synergist, in an amount from about 7 to about 11 parts per hundred, a first hindered phenolic stabilizer, in an amount from about 0.05 to about 0.30 parts per hundred, and a second hundred phenolic stabilizer, in an amount from about 0 to about 0.30 parts per hundred, a polypropylene polymer in an amount from 2 to 10 parts per hundred. The polyethylene blend further comprising a low density polyethylene, in an amount from about 10 to about 50 parts per hundred.

19 Claims, No Drawings

FLAME RETARDED POLYETHYLENE WIRE INSULATIONS

FIELD OF THE INVENTION

This invention relates to wire insulations. More particularly, this invention relates to a high performance and easily extrudable flame retarded polyethylene composition for wire insulation.

BACKGROUND OF THE INVENTION

A variety of flame retarded polyethylene compositions (FRPE) for wire insulations are known. These known FRPE wire insulations are typically highly filled and contain brominated diphenyl oxides. Although these known FRPE wire insulations provide a generally adequate means to protect or insulate wires, it has been found that there are many problems associated with their use, as described below.

First, many of the known flame retarded polyethylene compounds that are used in wire insulations extrude with high head pressures and disrupt the conductor centering. This further results in stressed machine parts during the extrusion process.

Second, most of the known flame retarded polyethylene compounds contain brominated diphenyl oxides (BDPO) which, under some conditions, cause the release of undesirable dioxin and furan compounds which are toxic when burned.

Third, many of the known flame retarded polyethylene compounds have extensive insulation faults due to the presence of large filler particles.

SUMMARY OF THE INVENTION

Accordingly, it is an object of the present invention to provide a flame retarded polyethylene composition for wire insulation that has high performance and which is easily extrudable.

It is another object of the present invention to provide a flame retarded polyethylene composition for wire insulation that lowers extrusion pressure.

It is a further object of the present invention to provide a flame retarded polyethylene compound for wire insulation that does not contain brominated diphenyl oxide flame retardants, which under some conditions, cause the release of undesirable dioxin and furan compounds which are toxic when burned.

It is yet a further object of the present invention to provide a flame retarded polyethylene composition for wire insulation that eliminates insulation faults.

The objectives and advantages of the present invention are achieved, in a preferred embodiment, by providing a flame retardant polyethylene composition having polyolefin base resins, flame retarding chemicals, flame retarding synergists, stabilizers and lubricants which act as processing aids.

DETAILED DESCRIPTION OF THE INVENTION

The present invention provides a polyolefin base resin that is preferably a single or blended polyethylene base which not only provides smooth extrusion and low head pressure but also provides the level of flame retardant needed. A typical polyethylene composition will contain both a high density and a very low density resin. The high density resin provides structural strength and crush resistance to the flame retarded polyethylene composition. The amount of high density resin present in 100 parts of the polyethylene composition is at least about 50 parts but preferably is 55 parts. An example of a high density resin is DGDK 3364 which is manufactured by Union Carbide and which includes a melting point of 125 degrees Celsius. Likewise, the very low density resin provides flexibility and tolerance to additives. The amount of very low density resin present in 100 parts of the polyethylene composition is at least about 5 parts but preferably is 30 parts. An example of a very low density resin is Exact 3022 or Exact 3001 made by Exxon and which includes a melting point of 94 degrees Celsius.

The polyethylene blend may also include a low density polyethylene, such as Exxon LD 411, in an amount at least about 10 parts per hundred of the polyethylene composition. Alternatively, Quantum NA-510 or Union Carbide DYNH-1 may be used in the formulation.

The overall melt flow index of the polyethylene blend is typically around 3 to 6 which provides milder extrusion pressures and smoother flow in the die.

The specific gravity of the polyethylene blend is about 0.92.

The flame retardants used in the polyethylene composition contains both a primary flame retardant and a secondary flame retardant.

The primary flame retardant melts at a temperature well above the melt point of the polyolefin resin base but below the compounding process and extrusion process (insulation) temperatures. The amount of primary flame retardant used in the polyethylene composition is from about 30 to about 40 parts per hundred of polyethylene blend but is preferably 35 parts per hundred. In the preferred embodiment, tetrabromobisphenol-A is used in the polyethylene composition and is sold by Great Lakes Chemical under the name of BA 59 P. Tetrabromobisphenol-A includes a melting point of 179 degrees Celsius. Tetrabromobisphenol-A is not a filler.

The secondary flame retardant is used in conjunction with the first flame retardant to enhance the flame retardancy of the compound and can be (1) a liquid or melting material with a melt point above 86° C. but well below the primary flame retardant melt point or (2) a filler (non-melting) type flame retardant, such as Dechlorane +35 Occidental Chemical Corporation which is a dodecachloro-dodecahydro-dimethanodibenzo cyclooctene, with a particle size distribution that insures no particles greater than 12 microns. The amount of secondary flame retardant used in the polyethylene composition is from about 5 to about 15 parts per hundred but is preferably 10 parts per hundred. In the preferred embodiment, Dechlorane +35 is used and is a chlorinated flame retardant. Dechlorane +35 includes a melting point of 350 degrees Celsius and is made by Occidental.

The use of a secondary flame retardant, in conjunction with the first flame retardant, is essential because it enhances the LoI and it does not contain the undesired BDPO. Thus, while the primary flame retardant may be used alone in the polyethylene composition, the preferred embodiment requires both the presence of a primary and secondary flame retardant for the above-mentioned reasons. The proportions of the two above-mentioned flame retardants may be interchanged based on the degree of flame retardancy desired.

The above combinations of primary and secondary flame retardants allows for successful compounding of the materials by minimizing the dispersive mixing required since only a small portion, if any, of the flame retardant material is of the filler type. In the preferred embodiment, a filler is used in the polyethylene composition which has a controlled maximum particle size in the desired range.

The flame retarding synergist in the polyethylene composition is a blend of antimony oxide and another material, such as zinc borate, that triggers polymer and flame retardant decomposition when the polyethylene composition is exposed to an igniting flame. This synergistic blend is critical since most melting flame retardants exhibit mediocre performance with antimony oxide alone. Alternatives to zinc borate include zinc stearate, magnesium stearate, ammonium octamolybdate (AOM) or zinc stannate. Alternatives to antimony oxide include Anzon antimony oxide BAO, M&T Thermoguard S, or Amspec KR.

The amount of antimony oxide that is used in the polyethylene composition is from about 12 to about 20 parts per hundred but is preferably 16 parts per hundred. An example of an antimony oxide is TMS which is made by Anzon Americas. Similarly, the amount of zinc borate that is used in the polyethylene composition is from about 7 to about 11 parts per hundred but is preferably 9 parts per hundred. In the preferred embodiment, ZB-467 Lite by Climax Performance Chemicals is used in the polyethylene composition.

The stabilizer in the polyethylene composition provides protection from degradation. A typical composition contains one or more hindered phenolic stabilizers and may have a secondary stabilizer. The primary hindered phenolic stabilizer used in the polyethylene composition is from about 0.05 to about 0.30 parts per hundred but is preferably 0.20 parts per hundred. An example of a primary stabilizer is Irganox 1010 made by Ciba Geigy. Likewise, the secondary hindered phenolic stabilizer is present in the composition in an amount of from about 0 to about 0.30 parts per hundred but is preferably 0.20 parts per hundred. An example of a secondary stabilizer is Irganox MD 1024 by Ciba Geigy.

The following Example illustrates the current compound formulation of the inventive composition.

| TYPE | MATERIAL | LEVEL | S.G. | $/# |
| --- | --- | --- | --- | --- |
| HDPE | Carbide DGDK3364 | 55.00 | 0.945 | $0.710 |
| LDPE | Exxon LD 411 | 25.00 | 0.920 | $0.440 |
| VLDPE | Exact 3022 | 15.00 | 0.902 | $0.750 |
| FR | Great Lakes Ba 59 P | 35.00 | 2.200 | $1.370 |
| FR | Dechlorane +35 | 10.00 | 1.800 | $3.050 |
| FR | Antimony Oxide | 16.00 | 5.500 | $1.100 |
| SYN | Climax ZB 467 Lite | 9.00 | 2.740 | $1.550 |
| STAB | Irganox 1010 | 0.20 | 1.200 | $6.750 |
| STAB | Irganox 1024 | 0.20 | 1.200 | $8.750 |
| LUBE | Stearic Acid | 1.60 | 0.840 | $0.450 |
| PP-LUBE | Exxon PD 8062 | 5.0 | 0.902 | 0.70 |

The compounding of the above materials is preferably processed at a temperature of 190 to 200 degrees Celsius. Likewise, the above materials are preferably extruded at temperatures between 179 to 205 degrees Celsius. The Limiting Oxygen Index (L.O.I.) for the above formulation is 32–34.

The above current compound formulation includes a blend of high, low and very low density polyethylene with a small amount of polypropylene to smooth extrusion i.e., from about 2 to about 10 parts. Moreover, the specific gravity of the above formulation is about 1.25.

The above formulation may include alternative materials. For example, an alternative to Exxon LD 411 is Quantum NA-510 or Union Carbide DYNH-1; an alternative to Exxon PD 8062 polypropylene is Himont SE 191 or Quantum PP 1602 WF. Likewise, an alternative to antimony oxide is Anzon Antimony oxide BAO, M&T Thermoguard S, or Amspec KR.

The foregoing is for purposes of illustration rather than limitation of the scope of protection accorded this invention. The latter is to be measured by the following claims, which should be interpreted as broadly as the invention permits.

The invention claimed is:

1. A flame retarded composition for wire insulations comprising:

a polyethylene blend comprising a high density polyethylene, in an amount at least about 50 parts per hundred parts of said polyethylene blend, a low density polyethylene in an amount of at least about 10 per hundred parts of said polyethylene blend, a very low density polyethylene, in an amount of at least about 5 parts per hundred of said polyethylene blend, and a polypropylene lubricating polymer, in an amount from about 2 to about 10 parts per hundred;

a primary brominated flame retardant in an amount from about 30 to about 40 parts per hundred of said polyethylene blend;

a secondary chlorinated flame retardant, in an amount from about 5 to about 15 parts per hundred;

a mixture comprising a first flame retarding material of antimony oxide in an amount from about 12 to about 20 parts per hundred and a second flame retarding material in an amount from about 7 to about 11 parts per hundred, said second flame retarding material is selected from the group consisting of zinc borate, zinc stearate, zinc stannate and ammonium octamolybdate;

a first hindered phenolic stabilizer, in an amount from about 0.05 to about 0.30 parts per hundred; and a second hindered phenolic stabilizer, in an amount from about 0 to about 0.30 parts per hundred.

2. The composition of claim 1 wherein said brominated flame retardant is tetrabromobisphenol A, and said chlorinated flame retardant is a dodecachloro-dodecahydro-dimethanodibenzo cyclooctene.

3. The composition of claim 2 wherein said second flame retarding material is zinc borate.

4. The composition of claim 3 comprising:

about 55 parts per hundred of high density polyethylene;

about 25 parts per hundred of low density polyethylene;

about 30 parts per hundred of very low density polyethylene;

about 35 parts per hundred of primary brominated flame retardant;

about 10 parts per hundred of secondary chlorinated flame retardant;

about 16 parts per hundred of first flame retarding material;

about 9 parts per hundred of second flame retarding material;

about 0.20 parts per hundred of first hindered phenolic stabilizer;

about 0.20 parts per hundred of second hindered phenolic stabilizer; and about 5 parts per hundred of polypropylene lubricating polymer.

5. The composition of claim 1 wherein said primary brominated flame retardant is tetrabromobisphenol A.

6. The composition of claim 1 wherein said secondary chlorinated flame retardant is dodecachloro-dodecahydro-dimethanodibenzo cyclooctene.

7. The composition of claim 1 having a specific gravity of 1.25.

8. A flame retarded composition for wire insulations comprising:
   a polyolefin base resin that includes a high density polyethylene and a very low density polyethylene blend;
   a mixture of flame retarding chemicals that includes a brominated flame retardant and dodecachloro-dodecahydro-dimethanodibenzo-cyclooctene;
   a mixture of flame retarding materials that includes antimony oxide and zinc borate; and
   at least one hindered phenolic stabilizer.

9. The flame retarded composition of claim 8 further comprising a low density polyethylene.

10. The flame retarded composition of claim 8 further comprising a polypropylene polymer to aid in extrusion smoothness.

11. A flame retardant wire insulation composition comprising:
    a polyethylene blend of three polyethylenes comprising a high density polyethylene, a low density polyethylene and a very low density polyethylene and each of said three polyethylenes having a different specific gravity;
    a mixture of tetrabromobisphenol and a chlorinated dimethanodibenzo cyclooctene, a mixture of antimony oxide and a compound selected from the group consisting of zinc borate, zinc stearate, zinc stannate and ammonium octamolybdate; and
    at least one hindered phenolic stabilizer.

12. The composition of claim 11 wherein said compound is zinc borate.

13. The composition of claim 11 which includes in the polyethylene blend from about 2 to about 10 parts per hundred of a polypropylene lubricating polymer.

14. A flame retardant wire insulation composition comprising:
    100 parts of a polyethylene blend wherein said 100 parts is comprised of at least 50 parts of high density polyethylene and at least 5 parts of a very low density polyethylene;
    from about 30 to about 40 parts of a brominated primary flame retardant;
    from about 5 to about 15 parts of a chlorinated secondary flame retardant;
    from about 12 to about 20 parts of antimony oxide; and
    from about 7 to about 11 parts of a material selected from the group consisting of zinc borate, zinc stearate, zinc stannate and ammonium octamolybdate.

15. The composition of claim 14 wherein the 100 parts of said polyethylene Mend includes at least 5 parts of a low density polyethylene.

16. The composition of claim 14 wherein the primary flame retardant is tetrabromobisphenol and the composition has from about 0.5 to about 0.3 parts of a first hindered phenolic stabilizer and from about 0 to about 0.3 parts of a second hindered phenolic stabilizer, 17. The composition of claim 16 wherein the 100 parts of said polyethylene blend includes at least 5 parts of a low density polyethylene.

18. The composition of claim 17 wherein the 100 parts of said polyethylene blend includes from about 2 to about 10 parts polypropylene.

19. The composition of claim 18 wherein the composition contains zinc borate and the secondary flame retardant is dodecachloro-dodecahydro-dimethanodibenzo cyclooctene.

* * * * *